United States Patent [19]

Hart et al.

[11] Patent Number: 5,182,142
[45] Date of Patent: Jan. 26, 1993

[54] METHOD FOR FORMING A TRANSPARENT COATING ON RUBBER ARTICLES

[75] Inventors: George M. Hart, Adrian; Mark E. Hayford, Blissfield, both of Mich.

[73] Assignee: Wacker Silicones Corporation, Adrian, Mich.

[21] Appl. No.: 679,402

[22] Filed: Apr. 2, 1991

Related U.S. Application Data

[60] Division of Ser. No. 515,534, Apr. 30, 1990, Pat. No. 5,066,703, which is a continuation of Ser. No. 285,174, Dec. 16, 1988, abandoned, which is a continuation-in-part of Ser. No. 245,486, Sep. 19, 1988, abandoned.

[51] Int. Cl.$^5$ .............................................. B05D 3/02
[52] U.S. Cl. ................................ 427/393.5; 264/134; 428/492
[58] Field of Search ............... 264/134, 135, 136, 137, 264/130; 428/494, 492, 495, 515, 519, 520, 521; 425/363; 156/289; 427/393.5; 524/437, 25, 55, 56

[56]  References Cited

U.S. PATENT DOCUMENTS

| | | | |
|---|---|---|---|
| 3,513,146 | 5/1970 | Naarmann | 524/437 |
| 4,092,279 | 5/1978 | Piskoti | 524/2 |
| 4,217,395 | 8/1980 | Kuan et al. | 428/494 |
| 4,285,897 | 8/1981 | Zakaria et al. | 264/130 |
| 4,379,873 | 4/1983 | Wilson | 524/423 |

Primary Examiner—Jay H. Woo
Assistant Examiner—Robert B. Davis

[57] ABSTRACT

A method for molding rubber articles having a transparent coating thereon which includes coating the outer surface of an uncured rubber article with an aqueous composition containing a preformed latex binder, an emulsifying agent, an inorganic fluoro-containing compound having a refractive index of from 1.32 to 1.49 and a thickening agent and thereafter vulcanizing the coated rubber article. The resultant coated rubber article is free of surface defects.

11 Claims, No Drawings

METHOD FOR FORMING A TRANSPARENT COATING ON RUBBER ARTICLES

This application is a divisional application of copending application Ser. No. 07/515,534, filed on Apr. 30, 1990, and now U.S. Pat. No. 5,066,703 which was a continuation of application Ser. No. 07/285,174 filed Dec. 16, 1988, now abandoned, which was a continuation-in-part application of application Ser. No. 07/245,486, filed Sep. 19, 1988 and now abandoned.

This invention relates to a transparent coating for rubber articles, particularly to an aqueous transparent coating composition, which may be applied to rubber articles prior to molding, and more particularly to an aqueous coating for use as a molding aid for rubber articles which imparts a clear, transparent finish to rubber articles coated therewith.

BACKGROUND OF THE INVENTION

An aqueous coating composition is described in U.S. Pat. No. 4,092,279 to Piskoti in which a composition containing water, a latex binder, an emulsifying agent, a filler, a thickening agent, and a compound which imparts shear stability to the composition is applied to the side-wall area of a green tire carcass, and the carcass is then molded to the desired configuration.

One of the disadvantages of the composition described in U.S. Pat. No. 4,092,279 is that the identifying markings on the rubber article are obscured. Other problems which have plagued the tire manufacture is entrapped air which causes blemishes on the sidewalls and thereby results in a high rejection rate during manufacturing. Moreover, some of the compositions which have been employed heretofore have left a residue on the mold surface, which builds up over a period of time and results in defects on the sidewalls of the tire. Also, some of the compositions employed heretofore do not provide adequate air bleed characteristics, do not have sufficient lubricating properties and will flex crack upon molding. Furthermore, some of the compositions are not stable on storage and cannot be sprayed after standing for a period of time.

Therefore, it is an object of this invention to provide a composition which may be applied to rubber articles to improve their molding characteristics. Another object of this invention is to provide a composition which aids in the molding of green tire carcasses to eliminate blemishes such as folds, "lights" (unfilled voids), knit failures and cracks on the sidewall surface of the tire. Another object of this invention is to provide a composition which is compatible with and will adhere to the tire carcass. Still another object of this invention is to provide a composition which will not flake or flex crack on the tire carcass. Still another object of this invention is to provide a composition which is stable during storage and is easily applied to the rubber surface. A further object of this invention is to provide a composition which will aid in the removal of entrapped air during molding of green tire carcasses A further object of this invention is to provide a composition which will not impair the weatherability and aging characteristics of molded rubber articles A still further object of this invention is to provide a mold release composition which will not build up on the mold surface. A still further object of this invention is to provide a transparent coating on the tire surfaces which will permit identifying markings to remain readable during and after the molding process.

SUMMARY OF THE INVENTION

The foregoing objects and others which will become apparent from the following description are accomplished in accordance with this invention, generally speaking, by providing an aqueous composition containing (A) from 1 to 80 percent by weight of latex, (B) from 0.01 to 20 percent by weight of an emulsifying agent, (C) from 2 to 80 percent by weight of an inorganic fluoro-containing compound as a filler which has a refractive index of from 1.32 to about 1.49, (D) from 0.1 to 10 percent by weight of a thickening agent, (E) from 0 to 10 percent by weight of a compound which imparts shear stability to the composition, (F) from 0 to 60 percent by weight of a filler other than the inorganic fluoro-containing compound, and (G) from 20 to 85 percent by weight of water based on the weight of the composition. The amount of water added to the composition may vary over a wide range depending on the solids concentration desired. Preferably the solids concentration of the resultant composition may range from 15 to 80 percent by weight based on the total weight of the composition. The term "solids concentration" refers to the nonvolatile materials that remain after heating the composition to 105° C. at atmospheric pressure for two hours.

DESCRIPTION OF THE INVENTION

The latex is a polymeric material dispersed in the form of small particles in a liquid, usually water. The preferred polymeric compounds are vulcanizable rubbers including natural rubber and various synthetic polymers which are made by in-situ polymerization in an emulsion state. Examples of synthetic polymers are those prepared from homopolymers of conjugated dienes such as isoprene, butadiene, 2-chlorobutadiene and copolymers thereof, as well as with various monoethylenically unsaturated polymers such as styrene, dichlorostyrenes, alpha-methylstyrene, para-trifluoromethylstyrene, vinyl pyridine and the like. Especially useful are copolymers of styrene and butadiene, known as SBR and containing about 10 to 60 percent by weight of styrene and 90 to 40 percent by weight of butadiene as well as natural rubber, which is polyisoprene. Mixtures of the various homopolymers and copolymers may also be used.

These synthetic polymers and/or copolymers are used in the form of a latex which is a stabilized dispersion made by in-situ polymerization in an emulsion state, in for example, water. Typical dispersions contain about 30 to 85 percent by weight of rubber solids.

The amount of latex (A) present in the composition prior to dilution with water is from 1 to 80 percent by weight and more preferably from about 5 to 60 percent by weight based on the weight of the composition.

Various emulsifying agents (B) may be employed in this composition to enhance the formation and/or to promote stability of the composition. Examples of suitable emulsifying agents are nonionic emulsifiers such as polyoxyethylene alkyl phenols, nonylphenoxypoly(ethyleneoxy) ethanols (available from General Aniline and Film Corporation), polyoxyethylene sorbitol hexastearate, polyoxyethylene (2 mol) cetyl ether (available from Imperial Chemical Industries of America), trimethylnonyl ether of polyethylene glycol, (molecular weight about 626, and containing from 6 to 14 ethylene oxide radicals per molecule, available as TERGITOL TMN-10 from Union Carbide Corporation), polyoxyethylene sorbitol oleate (saponification number 102-108 and having a hydroxyl number of 25-35, available as ATLOX 1087 from Imperial Chemical Industries of America). Examples of suitable anionic emulsifying agents which may be used are sodium alkylarylpolyether sulfonate (available as TRITON X-202 from Rohm and Haas), a partial sodium salt of a phosphate ester of an ethylene oxide adduct of a nonylphenol containing from 4 to 10 ethylene oxide radicals per molecule (molecular weight about 1,112 and an acid number of from 7 to 8, available as GAFAC LO-529 from General Aniline and Film Corporation) and the like. Other emulsifying agents which may be employed are salts of organic acids, having from 10 to 30 carbon atoms such as alkali metal oleates, stearates, rosinates, ammonium and amine salts of the above organic acids, such as ammonium oleate, ammonium stearate, trimethylamine oleate, trimethylamine stearate and the like. A preferred emulsifying agent is an amine dodecyl benzene sulfonic acid (available as NINATE 411, from Stepan Chemical Company).

Even though the amount of emulsifying agent is not critical, it is preferred that it be present in an amount of from 0.01 to 20 percent by weight and more preferably from about 0.1 to 10 percent by weight, based on the weight of the composition.

Surprisingly, it was found that when an inorganic fluoro-containing compound (C) which has a refractive index of from about 1.32 to about 1.49, is incorporated as a filler in the composition, the resultant coating is transparent. Identifying markings, such as bar codings, on for example, tires remain legible even after molding. In addition, the inorganic fluoro-containing compound appears to improve the release of the molded article from the mold and in addition reduces the blemishes which are generally present on the molded article.

Examples of inorganic fluoro-containing compounds having a refractive index of from about 1.32 to 1.49 are alkali metal fluoride compounds such as sodium fluoride, lithium fluoride and potassium fluoride; alkaline earth metal fluoride compounds such as calcium fluoride, magnesium fluoride, barium fluoride and strontium fluoride. Other inorganic fluoro-containing compounds which may be employed are, for example, aluminum fluoride and sodium fluoaluminate. The preferred inorganic fluoro-containing compound is sodium fluoaluminate.

It is preferred that the inorganic fluoro-containing compounds have an average particle size of from about 100 to 600 and more preferably from about 140 to about 400 mesh.

The inorganic fluoro-containing compounds are preferably employed in the composition in an amount of from about 2 to 80 percent by weight and more preferably from about 10 to 50 percent by weight based on the weight of the composition.

Various thickening agents (D) may be added to the composition of this invention to aid in keeping the fillers in suspension. Examples of suitable thickening agents are synthetic gums, water-soluble polysacchrides such as cellulose derivatives, i.e., hydroxyethylcellulose, methylcellulose, methylhydroxypropylcellulose, ethylhydroxyethylcellulose, methylethylcellulose, methylhydroxyethylcellulose, xanthan gums, polyacrylic acids and mixtures thereof.

Although the amount of thickening agent employed in this composition is not critical, it is preferred that the composition contain at least 0.1 percent and more preferably from about 1 to about 10 percent by weight based on the weight of the composition.

When the aqueous composition of this invention is to be continuously agitated prior to and during application, it has been found that compounds (E), which are capable of forming a protective colloid should be incorporated in the composition of this invention in order to impart shear stability thereto. In the absence of these compounds, the particles tend to agglomerate and to form a heterogeneous composition. Also, the composition is difficult to apply and forms a non-uniform coating on the surface, which in turn causes blemishes.

Examples of suitable compounds (E) which impart shear stability to the composition are casein, ammonium caseinate, alginates, polyvinyl alcohol, guar gum, styrene maleic anhydride copolymers and mixtures thereof.

The amount of compound (E) which is employed in the mixture of this invention to impart shear stability may range from 0 to 10 percent by weight and more preferably from 0.1 to 8 percent by weight, based on the weight of the composition.

In addition to the inorganic fluoro-containing compounds, other fillers (F) may be incorporated in this composition. Examples of suitable fillers (F) are mineral fillers such as silica. It is essential that the particle size of the mineral fillers (F) have an average BET surface area greater than 100 $m^2/g$, and more preferably an average BET surface area of from 200 to 400 $m^2/g$.

The amount of filler (F) which may be used in this composition may range from about 0 to 60 percent and more preferably from about 0.1 to 40 percent by weight based on the weight of the composition.

Additives which promote adhesion to the rubber articles, as well as antioxidants and antiozonates, may also be included in this composition.

Additives which impart lubricating properties, such as lecithin and carboxylic acids having from 10 to 30 carbon atoms may also be incorporated in the composition of this invention. Other lubricants which may be used are castor oil, esters and salts of organic acids having from 10 to 30 carbon atoms such as stearates, oleates and the like may also be incorporated in the composition of this invention.

Examples of suitable carboxylic acids which may be employed are myristic, pentadecanoic, palmitic, margaric, stearic, nonadecanoic, archidic, behenic, tetracosanoic, cerotinic, montanic, carnubic, as well as salts of these carboxylic acids.

The composition of this invention is preferably prepared by mixing the emulsifying agent (B), inorganic fluoro-containing compound (C), thickening agent (D) and any other filler (F) with water prior to the addition of the latex binder (A). If desired, an aqueous predispersion of compound (E), such as for example, caesin may be incorporated in the composition.

It has been found that the composition described above has excellent storage stability, is easily sprayed and because of its thixotropic properties, will not migrate or drip when applied to the outside surface. In addition, the composition does not leave a residue on the mold surface. Moreover, when the composition of this invention is applied to the green tire carcass and dried prior to vulcanization, the cured tire has a uniform surface appearance and is free of blemishes. Furthermore, the composition of this invention adheres to the sidewalls of the vulcanized tire and does not flake or flex crack after substantial use. More importantly, the composition forms a clear, transparent coating which permits the identifying markings such as bar codes to remain legible even after molding.

Although the composition of this invention may be applied to green tire carcasses prior to vulcanization in order to provide a tire whose sidewalls are free of defects, such as blemishes, folds, knit failures and cracks, the composition may also be applied to other rubber articles prior to molding to impart better surface appearance and to provide for identifying markings which are legible even after molding.

Various embodiments of this invention are further illustrated in the following examples in which all parts are by weight unless otherwise specified.

EXAMPLE 1

A composition is prepared by mixing the following ingredients in the order specified in a suitable mixer:

To about 578 parts of water are added 2 parts of NINATE 411 (trademark for amine dodecylbenzene sulfonate, available from Stepan Chemical Company) and the composition is mixed for about 20 minutes to dissolve the NINATE 411; then 85 parts of sodium fluoaluminate (cryolite) and 3 parts of KELZAN S (trademark for a high molecular weight polysaccharide; available from Kelco Corporation) are then added slowly to the composition and then mixed for an additional 15 to 60 minutes; then 5 parts of ammonium caseinate (15 weight percent in water); 1 part of a 50 weight percent solution of sodium hydroxide in water; 3 parts of oleic acid; 10 parts of CABOSPERSE 72 (trademark for a 12 percent dispersion of silica in water, available from Cabot Corporation); 1 part of concentrated ammonium hydroxide solution; 45 parts of HARTEX 103 (trademark for natural rubber latex, available from Firestone Tire and Rubber Company); and 15 parts of PL-403 (trademark for styrenebutyl rubber latex (available from Polysar Latex Division of Polysar Incorporated) are added and the resultant composition is mixed for about 20 minutes.

The resultant composition is thixotropic and may be continuously agitated 7 days without any change in viscosity. When the composition is applied to green tire carcasses and molded, the resultant tires are free of outside surface blemishes and rub-off while external markings such as labels and stencilled lettering on the tires remain visible.

EXAMPLE 2

The procedure of Example 1 is repeated, except that 185 parts of sodium fluoaluminate (cryolite) are added to the composition. Improved air-bleeding properties are observed.

EXAMPLE 3

The procedure of Example 1 is repeated, except that 285 parts of sodium fluoaluminate (cryolite) are added to the composition. Substantially improved air bleeding properties are observed while the external markings on the tire are visible.

EXAMPLE 4

The procedure of Example 1 is repeated, except that 185 parts of calcium fluoride (fluorspar) are substituted for the sodium fluoaluminate in the composition. Substantially identical results are obtained.

EXAMPLE 5

The procedure of Example 2 is repeated, except that 185 parts of sodium fluoride are substituted for the sodium fluoaluminate. Substantially the same results are obtained as in Example 2.

EXAMPLE 6

The procedure of Example 4 is repeated, except that 185 parts of magnesium fluoride are substituted for the calcium fluoride. Substantially the same results are observed as in Example 4.

EXAMPLE 7

The procedure of Example 1 is repeated, except that 5 parts of polyacrylic acids (available as CARBOPOL from B. F. Goodrich Chemical Co.) are substituted for KELZAN S in the composition. Substantially identical results are obtained.

COMPARISON EXAMPLE $V_1$

A composition is prepared in accordance with the procedure described in Example 1, except that ammonium caseinate is omitted. After stirring for 7 days, a substantial increase in viscosity is observed. The composition cannot be applied to a tire carcass by conventional spray equipment.

COMPARISON EXAMPLE $V_2$

A composition is prepared in accordance with the procedure described in Example 1, except that aluminum silicate is substituted for the sodium fluoaluminate (cryolite). When the composition is applied to a green tire carcass containing external markings for purposes of identification and molded, the coating substantially obscures the markings on the external surface of the molded tire.

Although specific examples of the invention have been described herein, it is not intended to limit the invention solely thereto, but to include all the variations and modifications falling within the spirit and scope of the appended claims.

What is claimed is:

1. A method for forming a transparent coating on rubber articles which when vulcanized are free of surface defects which comprises applying to a surface of an unvulcanized rubber article an aqueous composition containing (A) from 1 to 80 percent by weight based on the weight of the composition of preformed latex selected from the class consisting of natural rubber and synthetic polymers obtained from insitu polymerization of emulsified monomers, said synthetic polymers are selected from the class consisting of homopolymers of conjugated dienes and copolymers of the conjugated dienes and monomers having monethylenic unsaturation selected from the class consisting of styrene, substituted styrenes, and vinyl pyridine, (B) from 0.01 to 20 percent by weight based on the weight of the composition of an emulsifying agent selected from the group consisting of anionic and nonionic emulsifying agents, (C) from 2 to 80 percent by weight of the composition of a filler consisting of an inorganic fluoro-containing compound having a refractive index in the range of from 1.32 to 1.49, which is selected from the group consisting of an alkali metal fluoro compound, an alkaline earth metal fluoro compound, aluminum fluoride and sodium fluoaluminate, (D) from 0.1 to 10 percent by weight based on the weight of the composition of a thickening agent selected from the class consisting of synthetic gums, water-soluble polysaccharides, polyacrylic acids and mixtures thereof, and (G) from 20 to 85 percent by weight of water based on the weight of the composition and thereafter vulcanizing the coated rubber article.

2. The vulcanized rubber article having a transparent coating thereon which is obtained from the method of claim 1.

3. The method of claim 1, wherein latex (A) is present in an amount of from 5 to 60 percent by weight based on the weight of the composition.

4. The method of claim 1, wherein the filler (C) consisting of an inorganic fluoro-containing compound is present in an amount of from 10 to 50 percent by weight based on the weight of the composition.

5. The method of claim 1, wherein emulsifying agent (B) is present in an amount of from 0.1 to 10 percent by weight based on the weight of the composition.

6. The method of claim 1, wherein the inorganic fluoro-containing compound (C) is an alkali metal fluoro compound.

7. The method of claim 1, wherein the inorganic fluoro-containing compound (C) is an alkaline earth metal fluoro compound.

8. The method of claim 1, wherein the inorganic fluoro-containing compound (C) is aluminum fluoride.

9. The method of claim 1, wherein the inorganic fluoro-containing compound (C) is sodium fluoaluminate.

10. The method of claim 1, wherein thickening agent (D) is present in an amount of from 1 to 10 percent by weight based on the weight of the composition.

11. The method of claim 1, wherein a compound (E) which imparts shear stability to the composition is present in an amount up to 10 percent by weight based on the weight of the composition.

* * * * *